Aug. 16, 1966  R. A. JONES  3,266,732
ROLL CONTROL SYSTEM
Filed Sept. 3, 1963  3 Sheets-Sheet 1

INVENTOR.
Richard A. Jones

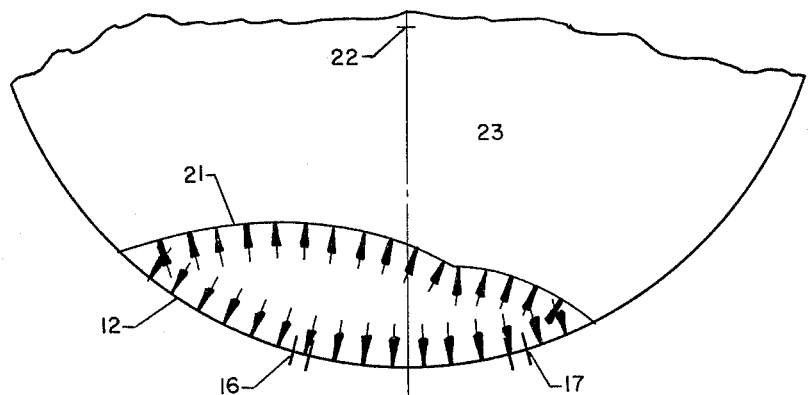
FIG. 3  PRIOR ART
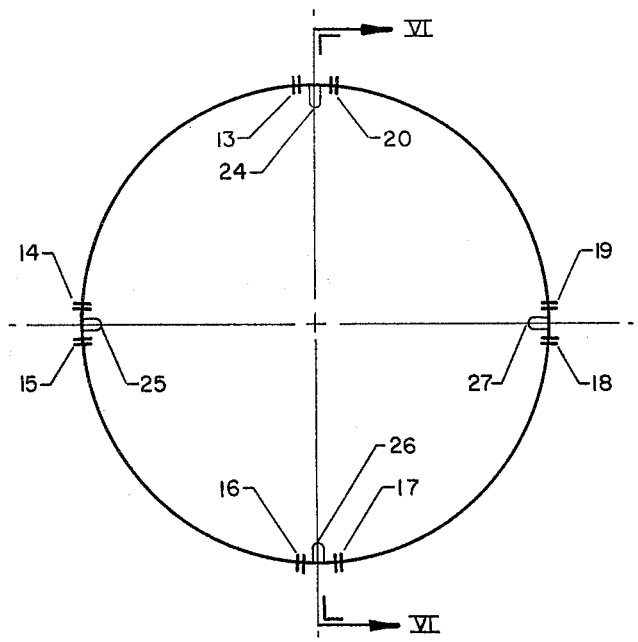
FIG. 4
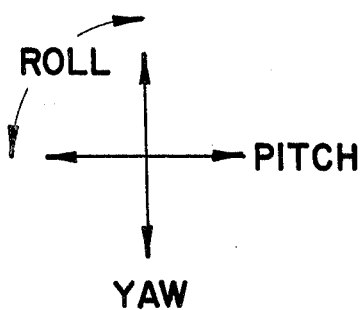
INVENTOR.
Richard A. Jones Aug. 16, 1966   R. A. JONES   3,266,732
ROLL CONTROL SYSTEM
Filed Sept. 3, 1963   3 Sheets-Sheet 3

INVENTOR.
Richard A. Jones ns # United States Patent Office 3,266,732
Patented August 16, 1966

3,266,732
ROLL CONTROL SYSTEM
Richard A. Jones, Cupertino, Calif., assignor to United Aircraft Corporation, East Hartford, Conn., a corporation of Delaware
Filed Sept. 3, 1963, Ser. No. 306,120
6 Claims. (Cl. 239—265.23)

The present invention relates to a space vehicle attitude control system and more particularly to a secondary injection roll control system.

In space maneuvers it is necessary to provide control of the space craft about its roll, pitch and yaw axes. In the past, pitch and yaw control have been accomplished by swivel nozzles or thrust vector control of fixed nozzles. To produce the necessary roll about the centerline axis of the vehicle, small external motors were used or small tangential nozzles, such as those shown in United States Patent Number 2,974,594 by J. Boehm, have been employed. Although these systems for roll control function well for their intended purpose, the present invention can provide roll control without employing additional hardware or moving parts on vehicles using secondary injection thrust vector control.

To provide the desired roll effect, the present invention provides a protrusion on the inner wall of the nozzle about which differential pressures are created. To produce the differential pressure field to act on the protrusions, conventional secondary injection ports are placed on either side thereof and control means are provided to vary the quantity of injectant flowing to the ports. To counteract any undesired pitch or yaw components produced by the secondary injection, simultaneous injection from oppositely located injectors is necessary. Consequently, in single motor vehicles where roll control in the past has required the employment of auxiliary systems the present invention effects this end by a minor modification to the nozzle structure and the carrying of additional quantities of injectant fluid.

It is, therefore, an object of the present invention to provide roll control in a rocket motor by a minor design modification to the rocket nozzle.

Other objects and many of the attendant advantages of the invention will be readily appreciated as the same becomes better understood by reference to the following detailed description when considered in connection with the accompanying drawings in which like reference numerals designate like parts throughout the figures thereof and wherein:

FIG. 3 shows a pressure profile of the pressure field at the injector ports upon injection of secondary fluid.

FIG. 4 illustrates the prior art nozzle of FIG. 2 employing the roll control device of the present invention.

Figure 1:
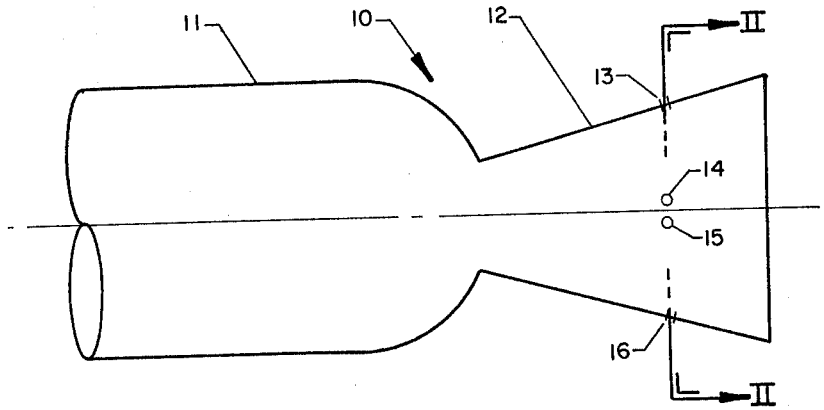
FIG. 1 shows a side view of a typical rocket nozzle.

Referring now to FIG. 1, rocket engine 10 is provided with a combustion chamber portion 11 and a nozzle portion 12. Located in the nozzle 12 are eight secondary injection ports, of which 13, 14, 15, and 16 are visible, for admitting predetermined quantities of fluid which set up a shock wave in the exhaust gas to deflect it. In this manner the rocket motor may be provided with pitch and yaw force components by shifting the angle of the thrust vector of the exhaust gases.

Figure 2:
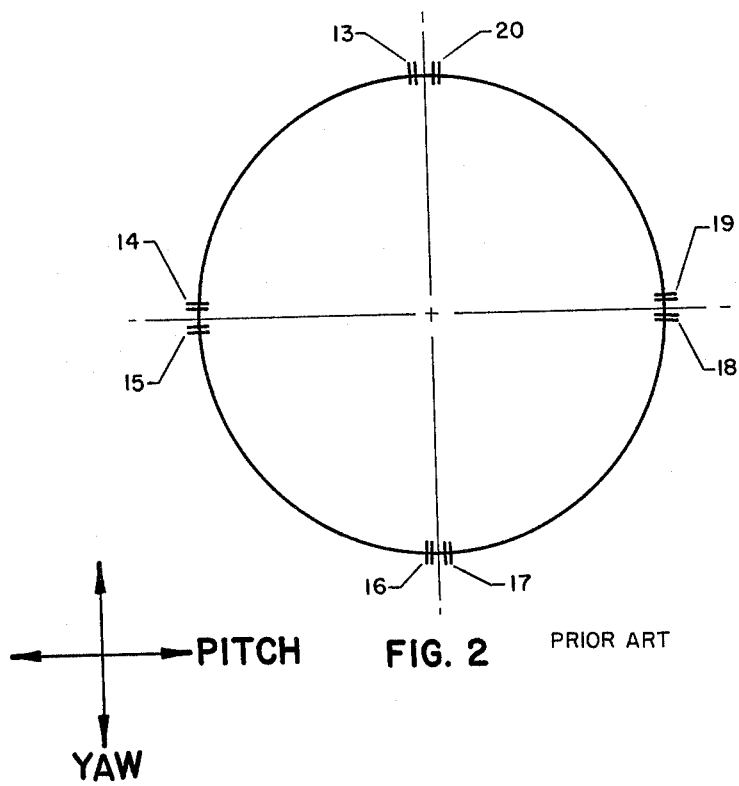
FIG. 2 is a cross-sectional view at line II—II of FIG. 1 showing a prior art rocket nozzle employing a pair of secondary injectors in each quadrant for yaw and pitch control.

As shown in FIG. 2 by injecting secondary fluid into the nozzle ports 16 and 17, the thrust vector of the nozzle is deflected upward whereby a yaw moment is imparted to the vehicle causing it to turn upward about its center of gravity. It is common practice to provide a plurality of injectors in each quadrant of the nozzle since greater control is possible, for example as shown in FIG. 2 where each quadrant is provided with two injection ports. The yaw component described above is produced by the additive effect of the momentum reaction of the injected fluid and the line of action of the pressure field created behind the shock-front set up by the action of the secondary fluid with the exhaust gases. The momentum reaction is insignificant, however, in comparison with the effect of the pressure field which bears against the inner wall of the nozzle.

As shown in greater detail in FIG. 3, secondary fluid injection in the nozzle through port 16 sets up a pressure field 21 having a line of action which intersects the centerline 22 of the nozzle. The pressure field is confined by the nozzle and the exhaust jet 23 thereby exerting forces normal to these confining surfaces. By injecting additional secondary fluid through port 17 at a different flow rate an asymmetric flow field is created. However, the two pressure fields are compatible and join to set up forces normal to all confining surfaces. Force components from the combined pressure fields act against the nozzle 12 producing a yaw moment that passes through the centerline of the nozzle. Consequently, no moment about the centerline is created to impart roll to the vehicle.

Turning now to FIG. 4 there is shown substantially the same nozzle as in FIG. 2 except that protrusions or fences 24, 25, 26, and 27 are provided between injector ports 20 and 13, 14, and 15, 16, and 17, and 18 and 19 respectively. In this manner it has been found that by injecting secondary fluid through ports 14, 16, 18, and 20 a counterclockwise roll moment is created since the pressure fields act against the side of the adjacent fence.

Figure 5:
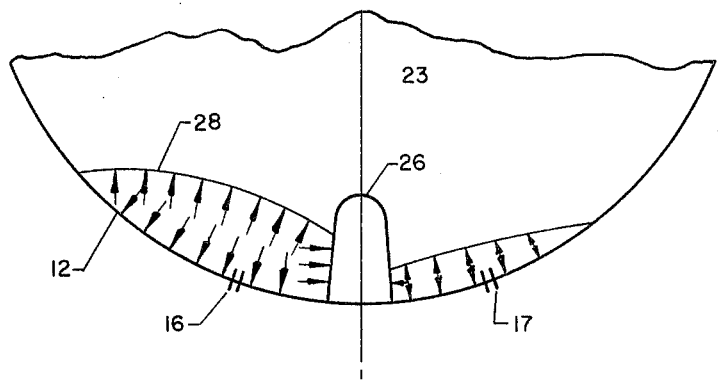
FIG. 5 shows the pressure profile of the pressure fields produced upon injection of secondary fluid in the present invention device, FIG. 4.

As shown in greater detail in FIG. 5 the pressure field 28 is confined by nozzle 12, exhaust gases 23, and fence 26. Since the pressure field 28 acts normal to any confining surface, the segment of the field in contact with the fence 26 produces a moment about the centerline of the nozzle creating a roll component. Additional fluid may be injected from port 17 if finer adjustment of the roll moment is desired. In the event no yaw component is desired, opening ports 20 and 13 to the same degree and 16 and 17, respectively, will cancel all yaw components and cause reinforcement of the roll components. If no roll is desired and only a yaw component is needed, equal injection of fluid from ports 16 and 17 will produce the necessary yaw.

Figure 6:
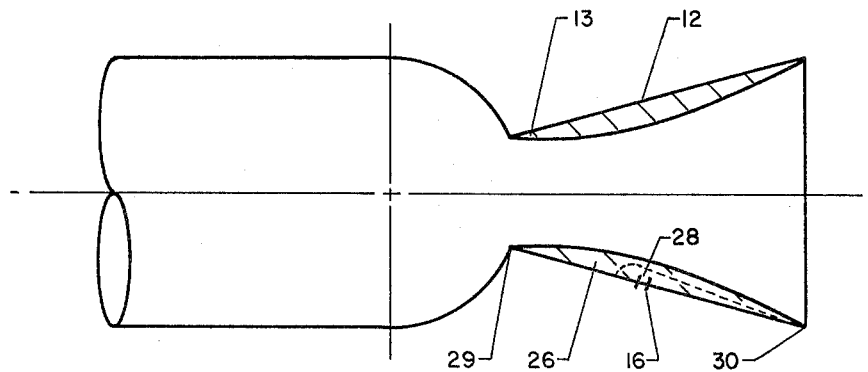
FIG. 6 is a cross-sectional view at line VI—VI of FIG. 4 showing the nozzle design of the present invention.

The fence 26 must, preferably, run for a predetermined distance along the nozzle wall 12 as shown in FIG. 6 in order to give the pressure field 28 adequate surface area to work against. To minimize erosion of the fence 26, it is preferable to begin the structure at the nozzle throat 29 and end at the exit portion 30 of the nozzle cone 12. Suitable material for the fence 26 depends on the vehicle mission. For applications involving short durations, the fence may be comprised of an ablative material such as a reinforced phenolic. However, for tactical missiles and other applications calling for long motor durations, a fence partition 26 made of heat resistant metal such as tungsten is preferred.

Although the above described system employs 4 sets of secondary injectors arranged according to quadrants, it is obvious that 3 sets 120° apart on the nozzle can be employed, as well as any suitable number of sets properly spaced apart around the nozzle circumference.

Obviously many modifications and variations of the present invention are possible in light of the above teachings. It is, therefore, to be understood that within the scope of the appended claims the invention may be practiced otherwise than as specifically described.

I claim:

1. A rocket nozzle having a plurality of pairs of radially inwardly directed injection ports located circumferentially about the inner surface of said nozzle, a partition located between the injection ports of each pair of said injection ports and extending inwardly of said inner surface, the individual injection ports of each pair located closer to said partition than any other partition and means associated with each of said injection ports for controlling flow therethrough.

2. A rocket nozzle as in claim 1 wherein said partition extends for a substantial length along the inner surface of the nozzle.

3. A rocket nozzle as in claim 1 wherein the partition extends from the throat to the trailing edge of the nozzle.

4. A rocket nozzle as in claim 1 wherein said partition is comprised of an ablative material.

5. A rocket nozzle as in claim 1 wherein said partition is comprised of a heat resistant material.

6. The divergent portion of a rocket nozzle comprising a hollow truncated conical body having a longitudinal center axis and an inside surface and an outside surface, a plurality of pairs of radially inwardly directed injection ports located circumferentially about said body opening into the hollow portion thereof, a partition of a predetermined height running longitudinally for a predetermined distance along the inside surface of said body and situated between each pair of injection ports, the individual injection ports of each pair so located as to be closer to said partition than any other partition, and means associated with each of said injection ports for controlling flow therethrough.

References Cited by the Examiner

UNITED STATES PATENTS

| | | | |
|---|---|---|---|
| 2,793,493 | 5/1957 | Kadosch et al. | 60—35.54 |
| 2,943,821 | 7/1960 | Wetherbee | 60—35.54 X |
| 3,036,430 | 5/1962 | Eggers et al. | 60—35.54 |
| 3,070,957 | 1/1963 | McCorkle | 60—35.55 |
| 3,121,312 | 2/1964 | Hopper | 60—35.54 |
| 3,132,476 | 5/1964 | Conrad | 60—35.54 |
| 3,166,897 | 1/1965 | Lawrence et al. | 60—35.54 |

FOREIGN PATENTS 748,983    5/1956   Great Britain.

MARK NEWMAN, *Primary Examiner.*

SAMUEL FEINBERG, SAMUEL LEVINE, *Examiners.*

V. R. PENDEGRASS, A. L. SMITH,
*Assistant Examiners.*